US011516106B2

(12) United States Patent
Agrawal et al.

(10) Patent No.: US 11,516,106 B2
(45) Date of Patent: Nov. 29, 2022

(54) PROTOCOL ANALYZER FOR MONITORING AND DEBUGGING HIGH-SPEED COMMUNICATIONS LINKS

(71) Applicant: Intel Corporation, Santa Clara, CA (US)

(72) Inventors: Anuj Agrawal, San Jose, CA (US); Chirag Bharat Thakkar, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 16/020,671

(22) Filed: Jun. 27, 2018

(65) Prior Publication Data

US 2019/0044840 A1 Feb. 7, 2019

(51) Int. Cl.
| H04L 12/26 | (2006.01) |
| H04L 29/06 | (2006.01) |
| H04L 43/18 | (2022.01) |
| H04L 69/18 | (2022.01) |
| H04L 43/50 | (2022.01) |
| H04L 43/045 | (2022.01) |

(52) U.S. Cl.
CPC ............ *H04L 43/18* (2013.01); *H04L 43/045* (2013.01); *H04L 43/50* (2013.01); *H04L 69/18* (2013.01)

(58) Field of Classification Search
CPC ....... H04L 43/18; H04L 43/045; H04L 43/50; H04L 69/18
USPC ........................................................ 709/224
See application file for complete search history.

(56) References Cited

U.S. PATENT DOCUMENTS

| 7,401,326 | B1 | 7/2008 | Durham et al. | |
| 8,069,371 | B2 | 11/2011 | Sengupta et al. | |
| 9,135,130 | B2 | 9/2015 | Dong et al. | |
| 9,465,406 | B1* | 10/2016 | Sarcar ..................... | H04L 69/28 |
| 2001/0053153 | A1 | 12/2001 | Bartsch | |
| 2002/0056047 | A1 | 5/2002 | Lehman | |
| 2003/0023901 | A1 | 1/2003 | Hack et al. | |
| 2007/0083644 | A1 | 4/2007 | Miller et al. | |
| 2010/0228964 | A1* | 9/2010 | Booth ...................... | H04L 63/16 713/151 |
| 2013/0013969 | A1 | 1/2013 | Rajarao et al. | |
| 2015/0092791 | A1* | 4/2015 | Cornett ............... | H04L 25/4906 370/468 |
| 2015/0139249 | A1 | 5/2015 | Suzuki et al. | |
| 2016/0134512 | A1* | 5/2016 | Geng ...................... | H04L 45/72 709/238 |
| 2016/0197809 | A1* | 7/2016 | Young ................. | G06F 11/3055 709/224 |

(Continued)

*Primary Examiner* — Schquita D Goodwin

(57) ABSTRACT

A Protocol Analyzer is provided for monitoring and debugging a high-speed communications link between a local device and a remote device. The local device may include a communications protocol block for interfacing with the remote device. The Protocol Analyzer may include an embedded logic debugging circuit on the local device, where the logic debugging circuit is configured to capture link data based on user-defined events to create a corresponding database of signal capture in a local memory. The Protocol Analyzer is configured to import the database from memory and to decode the link data to display on a user interface that organizes key link sequencing events along with their timestamps to help the user more accurately and quickly debug any link bring-up issues.

18 Claims, 17 Drawing Sheets

(56) References Cited

U.S. PATENT DOCUMENTS

| | | |
|---|---|---|
| 2017/0091060 A1 | 3/2017 | Vadivelu et al. |
| 2017/0176523 A1* | 6/2017 | Menon ............. G01R 31/31722 |
| 2017/0207987 A1* | 7/2017 | Kelly ..................... H04L 43/08 |
| 2018/0219732 A1* | 8/2018 | Liu ..................... H04L 41/0813 |
| 2018/0224502 A1* | 8/2018 | Champoux ............. G06F 11/27 |
| 2019/0028574 A1* | 1/2019 | Sun ........................ H04L 69/12 |

* cited by examiner

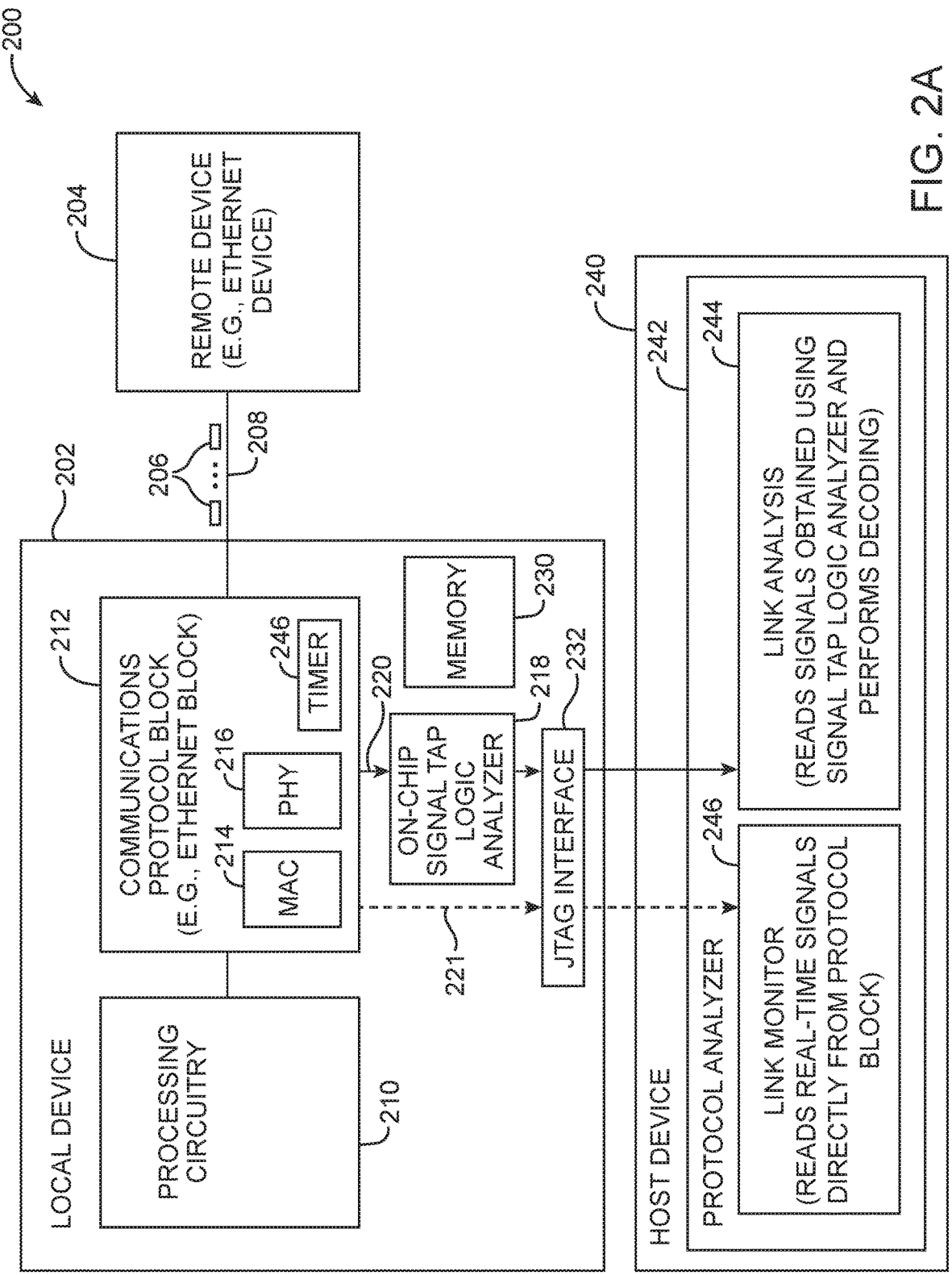

AN Packets Sent

| AN Packets(48-bits) | 0x0 | 0x000000008C0C01 (3.SSM_AN_ABL) | 0x000000008C4F01 (3.SSM_AN_ABL) |
|---|---|---|---|
| time(msec) | 0.000008 (2.SSM_RC_AN) | 67.266648 Base Page | 67.267456 Base Page |
| Packet Details(hex) | FEC[47:46] =0x0<br>AN_Tech[29:21] =0x0<br>TX_Nonce[20:16] =0x0<br>Next_Page15 =0x0<br>Ack[14] =0x0<br>Remote_Fault[13] =0x0<br>Pause_Ability[12:10] =0x0<br>Echoed_Nonce[9:5] =0x0<br>Selector_Field[4:0] =0x0 | FEC[47:46] =0x0<br>AN_Tech[29:21] =0x4<br>TX_Nonce[20:16] =0xc<br>Next_Page15 =0x0<br>Ack[14] =0x0<br>Remote_Fault[13] =0x0<br>Pause_Ability[12:10] =0x3<br>Echoed_Nonce[9:5] =0x0<br>Selector_Field[4:0] =0x1 | FEC[47:46] =0x0<br>AN_Tech[29:21] =0x4<br>TX_Nonce[20:16] =0xc<br>Next_Page15 =0x0<br>Ack[14] =0x1<br>Remote_Fault[13] =0x0<br>Pause_Ability[12:10] =0x3<br>Echoed_Nonce[9:5] =0x18<br>Selector_Field[4:0] =0x1 |

State Transition Diagram

Assumed Reference Timer CLock = 125MHz

| | States | Start (msec) | Stop (msec) | Delta (msec) |
|---|---|---|---|---|
| 702 | 1. SEQ_Initialize | | | |
| | INIT | 0.000 | 0.000 | 0.000 |
| 704 | 2. Auto_Neg | | | |
| | AN_RC | 0.000 | 0.203 | 0.203 |
| | AN_ABL | 0.203 | 67.312 | 67.109 |
| | AN_CHK | 0.000 | 0.008 | 0.008 |
| 706 | 3. Link_Training | | | |
| | LT_RC | 0.008 | 0.077 | 0.068 |
| | LT_CHK | 0.000 | 395.447 | 395.447 |
| 708 | 4. Data | | | |
| | DM_RC | 395.447 | 395.511 | 0.064 |
| | DM_CHK | 395.511 | 413.549 | 18.038 |
| | DM_RDY | 413.549 | 413.696 | 0.147 |

MAC & PHY | Statistics Counters | KR4

[Start Packet Generator]

[Read TX Statistics Counters]

[Pause TX Statistics Counters Collection]

[Reset TX Statistics Counters]

TX Statistics Registers are unpaused

TX Statistics Counters

Note: Only available when example design is instantiated

[Pause RX Statistics Counters]

[Pause RX Statistics Counters Collection]

[Reset RX Statistics Counters]

RX Statistics Registers are unpaused

RX Statistics Counters

| TX Counter | Value | | RX Counter | Value |
|---|---|---|---|---|
| Fragmented Frames | 0 | | Fragmented Frames | 0 |
| Jabbered Frames | 0 | 54 | Jabbered Frames | 0 |
| Any Size with FCS Err Frames | 0 | | Any Size with FCS Err Frames | 0 |
| Right Size with FCS Err Frames | 0 | | Right Size with FCS Err Frames | 0 |
| Multicast data Err Frames | 0 | | Multicast data Err Frames | 0 |
| Broadcast data Err Frames | 0 | | Broadcast data Err Frames | 0 |
| Unicast data Err Frames | 0 | | Unicast data Err Frames | 0 |
| Multicast Control Err Frames | 0 | | Multicast Control Err Frames | 0 |
| Broadcast Control Err Frames | 0 | | Broadcast Control Err Frames | 0 |
| Unicast Control Err Frames | 0 | | Unicast Control Err Frames | 0 |
| Pause Control Err Frames | 0 | | Pause Control Err Frames | 0 |
| 64 Byte Frames | 29069 | | 64 Byte Frames | 29069 |
| 65 - 127 Byte Frames | 28424 | | 65 - 127 Byte Frames | 28424 |
| 128 - 255 Byte Frames | 57643 | | 128 - 255 Byte Frames | 57643 |
| 256 - 511 Byte Frames | 115303 | | 256 - 511 Byte Frames | 115303 |
| 512 - 1023 Byte Frames | 230691 | | 512 - 1023 Byte Frames | 230691 |
| 1024 - 1518 Byte Frames | 222132 | | 1024 - 1518 Byte Frames | 222132 |
| 1519 - MAX Byte Frames | 6665655 | | 1519 - MAX Byte Frames | 6665655 |
| > MAX Byte Frames | 0 | | > MAX Byte Frames | 0 |
| Multicast data OK Frames | 0 | | Multicast data OK Frames | 0 |
| Broadcast data OK Frames | 0 | | Broadcast data OK Frames | 0 |
| Unicast data OK Frames | 7348917 | | Unicast data OK Frames | 7348917 |
| Multicast Control Frames | 0 | | Multicast Control Frames | 0 |
| Broadcast Control Frames | 0 | | Broadcast Control Frames | 0 |
| Unicast Control Frames | 0 | | Unicast Control Frames | 0 |
| Pause Control Frames | 0 | | Pause Control Frames | 0 |

52 points to "128 - 255 Byte Frames 57643"

FIG. 10B

PROTOCOL ANALYZER FOR MONITORING AND DEBUGGING HIGH-SPEED COMMUNICATIONS LINKS

BACKGROUND

This relates generally to communications systems, and more particularly, to methods and apparatus for monitoring high-speed communications between systems.

Local area networks are often implemented using the Ethernet network technology (commonly referred to as and defined by the IEEE 802.3 specification). In an Ethernet network, a local Ethernet device is coupled to a remote Ethernet device. The local Ethernet device typically includes an Ethernet module that transmits and receives Ethernet packets to and from the remote Ethernet device via an Ethernet link.

In practice, the Ethernet link connecting the local Ethernet device and the remote Ethernet device can sometimes suffer from degraded performance due to non-optimal signal driver strength, incompatible data rate support between the local Ethernet device and the remote Ethernet device or other mis-signaling issues. In an effort to debug the Ethernet link, a third-party Ethernet protocol decoder component has to be separately connected to the Ethernet link to help monitor the health of the Ethernet link. Such types of conventional external Ethernet protocol decoders can be very expensive and can cost $25,000 to $50,000 or more per unit. The logistical overhead for using such Ethernet decoders in a production system can also be overwhelming.

Moreover, attaching an external decoder to the Ethernet link would alter the signal integrity of the link. In other words, the resulting link behavior with the external decoder attached may vary significantly compared to the actual link behavior that occurs when the external decoder is not attached (i.e., link training behavior with and without the third-party decoder attached converges differently). The external decoder is also limited to only decoding Ethernet packets being exchanged via the Ethernet link and has no visibility into the internal states of the local device or the remote device.

It is within this context that the embodiments described herein arise.

BRIEF DESCRIPTION OF THE DRAWINGS

FIG. 2A is a diagram of an illustrative system that includes a local device, a remote device coupled to the local device via a data communications link, and a protocol analyzer running on a host device (e.g., a computer) that is used to monitor and debug the data communications link in accordance with an embodiment.

FIG. 7 is a diagram of an illustrative user interface listing a timestamp for each step in a link sequencer state machine in a single summary table in accordance with an embodiment.

FIGS. 10A-10C are diagrams of illustrative user interfaces for performing real-time status monitoring during link bring-up operations in accordance with an embodiment.

DETAILED DESCRIPTION

Figure 1:
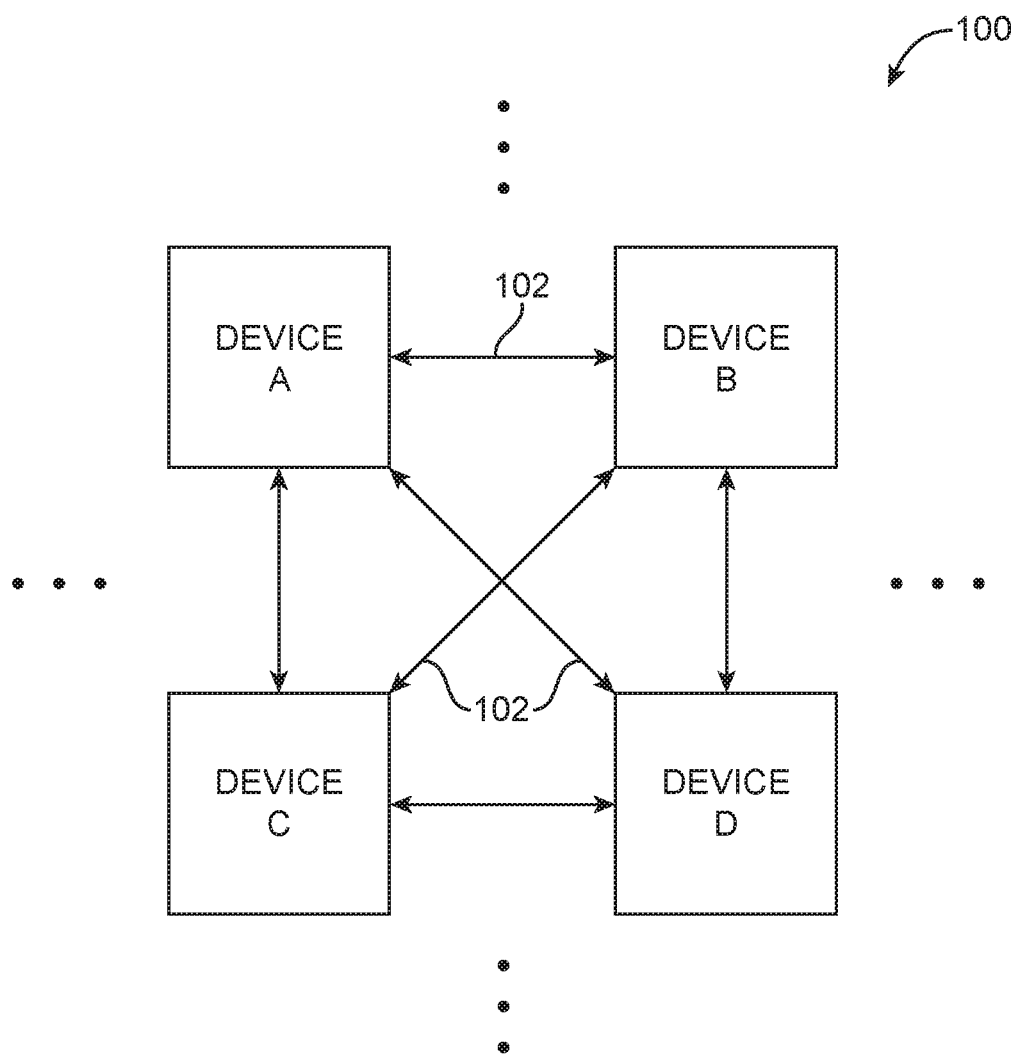
FIG. 1 is a diagram of illustrative interconnected electronic devices that may communicate with one another via data links in accordance with an embodiment.

The present embodiments relate to a protocol analyzer configured to monitor and debug a data communications link between a local device and a remote device. The local device includes a communications protocol block (e.g., a protocol interfacing block having a physical layer component and a media-access-control layer component) for communicating with the remote device using a given communications protocol, which may include but is not limited to the IEEE 802.3 Ethernet standard, the Peripheral Component Interconnect Express (PCIe) standard, the Interlaken standard, the Common Public Radio Interface (CPRI) standard, the Open Base Station Architecture Initiative (OBSAI) standard, the Serial RapidIO standard, the Society of Motion Picture and Television Engineers (SMPTE) standard, and/or other high-speed serial computer bus standards capable of transferring data at more than 1 Gbps, more than 10 Gbps, more than 100 Gbps, etc.

The local device may further include an on-chip signal tap logic analyzer configured to probe packet data and any associated signals processed by the communications protocol block during link bring-up operations or during normal operation of the local device. The on-chip signal tap logic analyzer may then store the gathered data in a local device memory.

A protocol analyzer tool running on a host device (e.g., a personal computer) may retrieve the gathered data from the memory and may decode the data to provide transparency into the internal state behavior of the local device during link bring-up operations and/or during normal operation of the local device while the local device is communication with the remote device. For example, the protocol analyzer may be configured to decode the link behavior of an Ethernet communications link. Link bring-up operations in this case might include Auto-Negotiation (AN), Link Training (LT), and Data Mode. The protocol analyzer may represent all the control and status information regarding each of the above modes and also show timing information of every event in each of the modes. All this information is represented in accordance with the IEEE 802.3 specification.

Protocol Analyzer may include two separate functions: (1) Link Monitor and (2) Link Analysis. The Link Monitor function displays the real time behavior of the protocol communications block. The Link Monitor utilizes a direct connection between the host device and the local device to retrieve the real time status and to display the real time status according to a corresponding protocol specification.

On other hand, the Link Analysis function would receive all the required captured data from an on-chip signal tap logic analyzer and would then decode it using protocol decoding algorithms to extract details of the actual communication happening between the local and remote devices. For example, the protocol decoding algorithms may be configured to observe the behavior of the captured signals along with any timing details to determine and map a certain signal behavior to a particular mode defined in a given protocol specification. Once the details are extracted, the protocol analyzer would display in a user friendly graphical interface representing data in compliance with protocol specific definitions and terminologies. This approach enables a user to understand and communicate information in protocol standards rather than hex or binary that the user would otherwise obtain from the signal tap logic analyzer.

The improved transparency also helps avoid finger-pointer between the various parties while reducing service requests to the manufacturer. The decoded information may be organized and presented with accurate timing information, which improves the user experience and substantially increases the speed with which the user can now debug the link (e.g., the user can now precisely isolate the point of failure by looking at the timing information for each internal state of the local device).

It will be recognized by one skilled in the art, that the present exemplary embodiments may be practiced without some or all of these specific details. In other instances, well-known operations have not been described in detail in order not to unnecessarily obscure the present embodiments.

An illustrative system 100 of interconnected electronic devices is shown in FIG. 1. The system of interconnected electronic devices may have multiple electronic devices such as device A, device B, device C, device D, and interconnection resources 102. The electronic devices A-D may be any suitable type of electronic device that communicates with other electronic devices. Examples of such electronic devices include basic electronic components and circuits such as analog circuits, digital circuits, optical circuits, mixed-signal circuits, etc. Such electronic devices may be part of a larger computing system, which may include but is not limited to a datacenter, a computer networking system, a data networking system, a digital signal processing system, a graphics processing system, a video processing system, a computer vision processing system, a cellular base station, a virtual reality system, an augmented reality system, a network functions virtualization platform, an artificial neural network, an autonomous driving system, and other wired or wireless computing networks.

Interconnection resources 102 may include conductive lines and busses, optical interconnect infrastructure, and/or wired and wireless networks with optional intermediate switching circuitry may be used to send signals from one electronic device to another electronic device or to broadcast information from one electronic device to multiple other electronic devices. For example, a transmitter in device B may transmit serialized data signals at a given transmission rate as a data stream over a serial communication link 102 to a receiver in device C. Similarly, device C may use a transmitter to transmit serialized data signals as a data stream over a serial communication link 102 to a receiver in device B.

If desired, multiple serial communication links may be used to transmit data. For example, multiple transmitters in a transmitting device may each transmit a portion of the data as serial data streams over multiple serial communication links or "channels" to multiple receivers in a receiving device. Upon reception, receiver circuitry in the receiving device may restore the data by aggregating portions from the different channels received at the multiple receivers. The aggregated data may then be stored by memory circuit on the receiving device or processed and retransmitted to another device.

FIG. 2A is a diagram of an illustrative communications system 200 that includes a local device such as local device 202 and a remote device such as remote device 204. Local device 202 may be coupled to remote device 204 via a communications path 208. In one suitable arrangement, remote device 204 may be an Ethernet device, which is configured to transmit and receive Ethernet packets 206 via path 208 in accordance with the IEEE 802.3 specifications. Path 208 over which packets 206 are conveyed is sometimes referred to as a data bus or data link.

Local device 202 may include processing circuitry 210 coupled to a communications protocol block 212. Circuitry 210 may include processing circuits such as embedded microprocessors, digital signal processors (DSP), microcontrollers, or other suitable processing circuitry. Communications protocol block 212 may include a physical-layer interface component 216 (oftentimes abbreviated as "PHY"), which connects the physical medium through which data is conveyed to and from block 212. PHY 216 may include (as examples) a physical coding sublayer (PCS) block, a forward error correction (FEC) block, a serializer, a deserializer, and/or other high-speed serial interface circuitry suitable for transmitting and receiving data.

Communications protocol block 212 may include a medium access control component 214 (oftentimes abbreviated as "MAC") that may serve as a data link layer component that is used to provide address and channel access control mechanisms to support unicast, multicast, or broadcast communications services.

The example of FIG. 2A in which communications protocol block 212 is an Ethernet block that transmits and receives Ethernet packets 206 to and from Ethernet device 204 is merely illustrative. In general, block 212 may be configured to communicate with any type of remote device using other high-speed communications protocols such as PCIe, Interlaken, CPRI, OBSAI, SMPTE, etc. If desired, the techniques described herein can be applied to Ethernet links, PCIe links, Interlaken links, CPRI links, and other high-speed serial communications links. For demonstrative purposes only, which is not intended to limit the scope of the present embodiments, a protocol analyzer that is configured to monitor communications operations (e.g., link bring-up operations or normal device operations) between devices 202 and 204 will be described in the context of an Ethernet link.

Figure 2B:
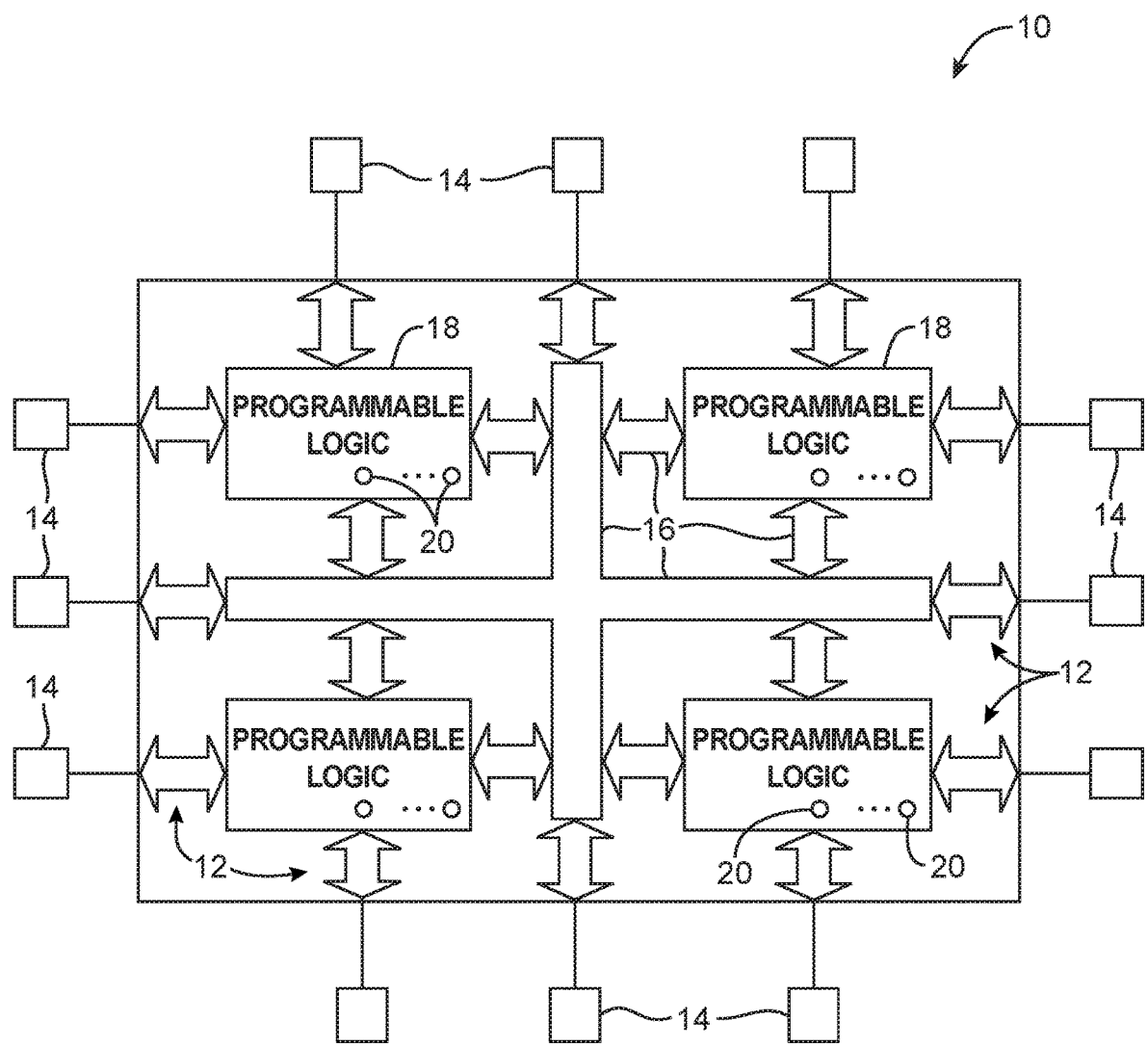
FIG. 2B is a diagram of an illustrative programmable integrated circuit in accordance with an embodiment.

In certain embodiments, local device 202 may be a programmable integrated circuit such as a programmable logic device (PLD) (see, e.g., PLD 10 in FIG. 2B). As shown in FIG. 2B, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Referring back to FIG. 2A, local device 202 that is implemented as a programmable logic device of the type shown in FIG. 2B is sometimes provided with an on-chip logic analyzer circuit such as signal tap logic analyzer 218. Signal tap logic analyzer 218 is an embedded functional debugging tool (e.g., reconfigurable or "soft" logic circuitry) configured to probe and capture signals from internal nodes of local device 202 during actual run-time, which provides non-intrusive access to signals at internal device nodes without having to physically connect those nodes to input-output pins. Signal tap logic analyzer 218 is sometimes referred to as an embedded logic debugging circuit, a logic debugging engine, a signal debugger tool, or a signal debugging block. In the example of FIG. 2A, signal tap logic analyzer 218 may be configured to tap into various internal signals of block 212 via path 220. Signal tap logic analyzer 218 typically captures hundreds or thousands of signal waveforms in response to custom user-defined triggering conditions during run-time and link bring-up operations of device 202. Signals gathered by signal tap logic analyzer 218 may be stored in an on-chip memory block 230.

Debugging communications link 208 by manually inspecting the hundreds or thousands of raw signal waveforms captured by embedded signal tap logic analyzer 218 can be challenging and very time consuming. For example, consider a scenario in which the signal tap logic analyzer generates more than 600 signal waveforms. In this scenario, a user who has to evaluate the 600+ waveforms and the complex relationships among those waveforms might take fourteen to sixteen months to determine the root cause of link failure.

In accordance with an embodiment, a protocol analyzer tool such as protocol analyzer tool 242 is provided that can improve user experience by providing accurate and relevant status and timing information while substantially reducing debugging time. Protocol analyzer 242 can analyze and decode 600+ signals and present the user only the important information needed in a user friendly graphical user interface.

As shown in FIG. 2A, protocol analyzer tool 242 may run on a host device 240 (e.g., a personal computer). Protocol analyzer tool 242 may be an executable software code that is stored on non-transitory computer readable storage media (e.g., tangible computer readable storage media). The software code may sometimes be referred to as software, firmware, data, program instructions, instructions, script, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, floppy diskettes, tapes, or any other suitable memory or storage device(s).

Protocol analyzer tool 242 stored on the non-transitory computer readable storage media may be executed on host device 240. When the protocol analyzer tool is installed on device 240, the storage media of device 240 has instructions and data that cause processor(s) and other computing equipment in host device 240 to execute various methods/processes. When performing these processes, the computing equipment is configured to implement the functions of protocol analyzer tool 242. Protocol analyzer tool 242 need not be implemented on a separate host device. In yet other suitable embodiments, protocol analyzer tool 242 might be implemented on local device 202 itself, such as a part of a debugging software tool running on processing circuitry 210.

Protocol Analyzer 242 may include two separate functions: (1) a link monitoring function 246 and (2) a link analyzer function 244. The link monitor function displays the real time behavior of protocol communications block 212. Link monitor 246 may utilize a direct connection path 221 via a JTAG (Joint Test Action Group) interface 232 between host device 240 and local device 202 to retrieve the real time status and to display the real time status according to the Ethernet protocol specification. The example of FIG. 2A in which JTAG interface 232 is used to convey test signals from local device 202 to host device 240 is merely illustrative. In other suitable arrangements, interface 232 might be a PCIe link, a Universal Serial Bus (USB) link, a serial ATA (SATA) link, a Small Computer System Interface (SCSI) link, a Thunderbolt link, and other suitable types of computer interfaces. In general, other mechanisms for verifying and testing the signals gathered from protocol communication blocks 212 can be implemented.

Depending on the communications protocol, block 212 may have to step through a series of an internal device states in order to successfully perform link bring-up. These internal device states may sometimes be referred to collectively as a "link sequencer state machine." Link analysis 244 may receive all the captured data stored in memory 230 from on-chip signal tap logic analyzer 218 via JTAG interface 232 and would then decode the signals using protocol decoding algorithms to extract details of the actual communications between the local and remote devices. Link analyzer 244 is aware of the various states of the link sequencer state machine and is therefore able to map various signaling events to different modes defined by the IEEE 802.3 specification (as an example).

Protocol analyzer 242 may further read a timer 246 configured within block 212 to provide accurate timing information such as timestamps for key events as block 212 steps through the various states of the link sequencer state machine. Protocol analyzer 242 would display in a user friendly graphical interface representing data in compliance with protocol-specific definitions and terminologies. This approach enables a user to understand and communicate information in protocol-specific terminology rather than raw hex or binary bits that the user would otherwise obtain from logic analyzer 218.

Figure 3:
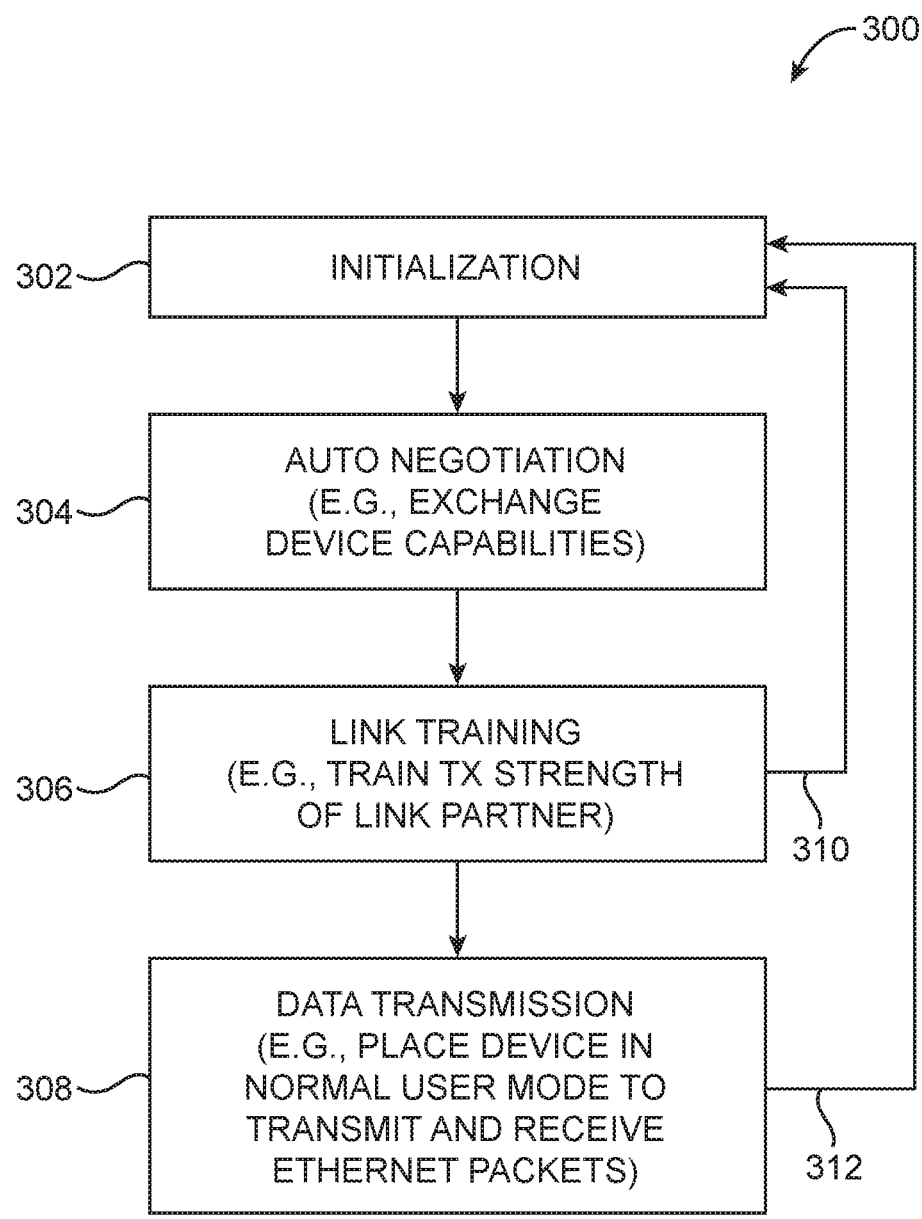
FIG. 3 is a diagram of illustrative modes defined by the IEEE 802.3 specification in accordance with an embodiment.

FIG. 3 is a diagram of illustrative modes for performing Ethernet link bring-up as defined by the IEEE 802.3 specification. As shown in FIG. 3, the Ethernet link bring-up modes include: an initialization mode 302, an auto negotiation mode 304, a link training mode 306, and a data transmission mode 308 (sometimes also referred to as data mode).

During initialization mode 302, all link interface components may be place in the default startup state. During auto negotiation mode 304, the local and remote devices exchange and choose common device capabilities such as transmission speed, duplex mode, and flow control. During link training mode 306, the local and remote devices adjust each other's transmission strength until data can be received correctly at both ends. If link training fails, the link bring-up process may return to initialization mode 302, as indicated by path 310. During data transmission mode 308 (or data mode), the local device is placed in normal user mode to transmit and receive Ethernet packets. If packets are no longer transmitted properly via the link during data mode 308, the link bring-up process may return to initialization mode 302, as indicated by path 312.

Figure 4A:
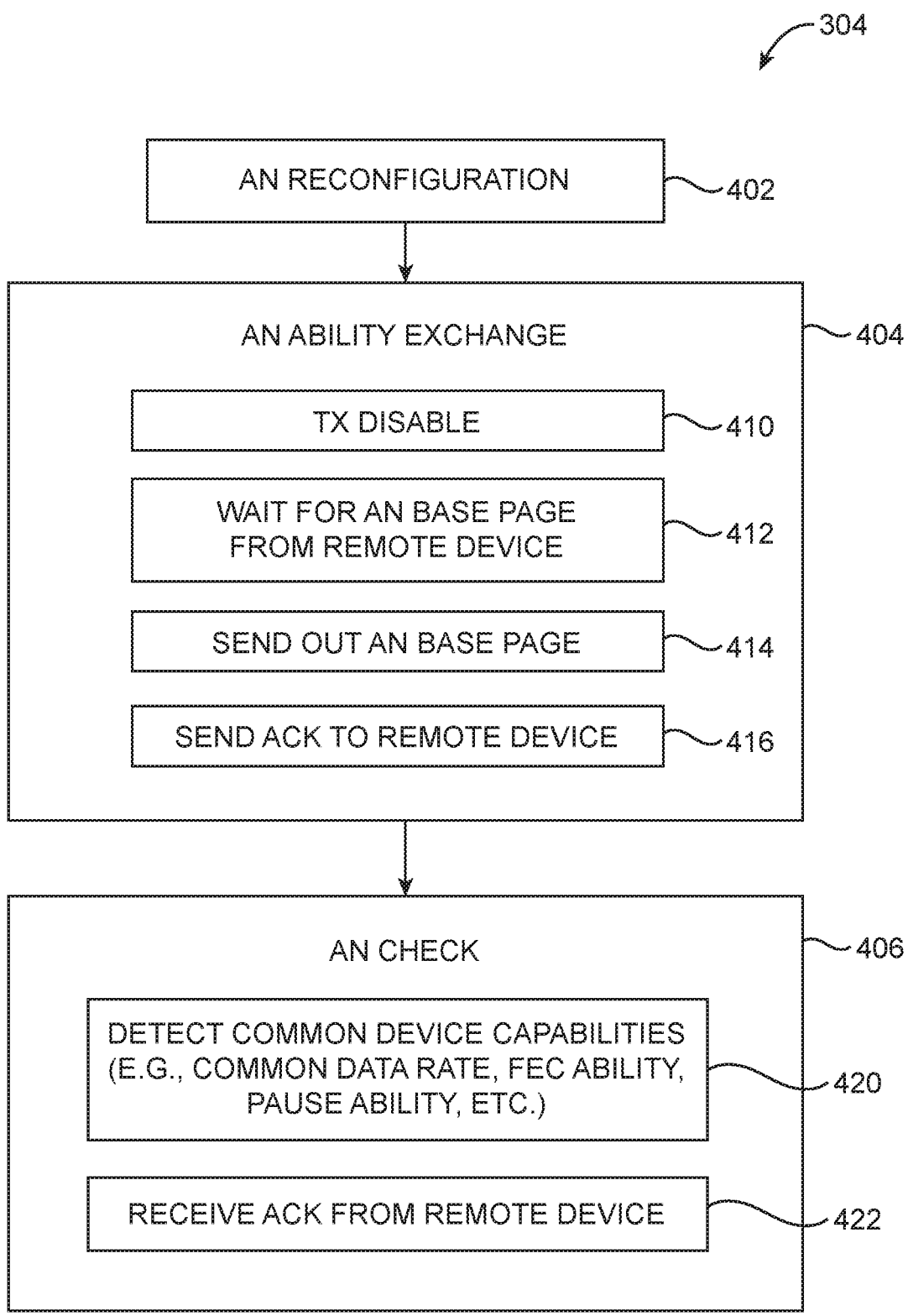
FIG. 4A is a flow chart of illustrative internal states that a communications protocol block steps through during an auto-negotiation (AN) mode in accordance with an embodiment.

FIG. 4A is a flow chart of internal states that block 212 steps through during auto negotiation (AN) mode 304. At step 402, Ethernet block 212 may perform auto negotiation (AN) reconfiguration (e.g., by programming Ethernet PHY 216 and MAC 214 for subsequent auto negotiation operations).

At step 404, Ethernet block 212 may exchange device abilities. At sub-step 410, block 212 may temporarily disable its transmission. By disabling the transmission, the link goes down, which causes remote device 204 to loop back to AN mode 304 to re-synchronize the link from scratch (see, e.g., via path 312 in FIG. 3). Ethernet block 212 should perform step 402 even if no link partner is connected. At sub-step 412, block 212 may wait for an auto negotiation (AN) base page from remote device 204. At sub-step 414, block 212 may send out an AN base page. At sub-step 416, block 212 may send an acknowledgement (ACK) to remote device 204. In general, steps 412 and 414 can be performed in any order. In some instances, the local device may receive an AN base page from the remote device before sending out its AN base page. In other instances, the local device may send out its AN base page to the remote device before receiving an AN base page from the remote device.

At step 406, Ethernet block 212 may perform auto negotiation (AN) check. At sub-step 420, block 212 may detect common device capabilities such as data rate, forward error correction (FEC) ability, pause ability, etc. At sub-step 422, Ethernet block 212 may receive an acknowledgement from remote device 204. AN check is complete when both the local and remote devices receive an acknowledgement.

Figure 4B:
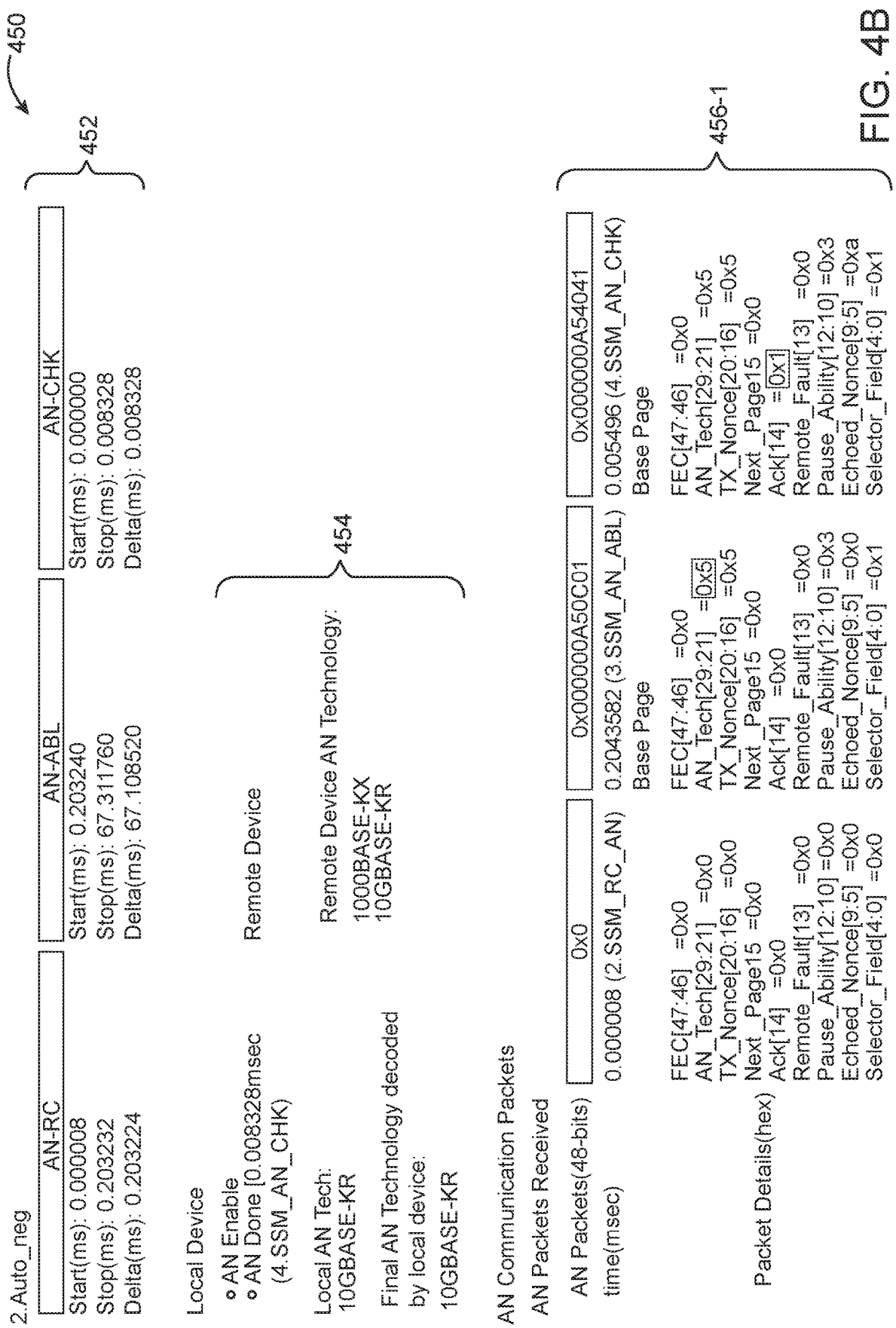
FIG. 4B is a diagram of an illustrative user interface that displays timing information of communication packets and key parameters associated with each state of the auto-negotiation mode in accordance with an embodiment.

Protocol analyzer tool 242 may be configured to provide accurate and useful timing information associated with each step or internal device state of block 212 during AN mode 304 (see, e.g., user interface 450 of FIG. 4B). As illustrated in FIG. 4B, portion 452 shows the high-level timing information associated with each of the three steps of auto negotiation. These 3 steps are device internal states of block 212 and collectively maps to the Auto Negotiation mode as defined by the IEEE 802.3 specification.

The AN reconfiguration step "AN_RC" (corresponding to step 402 in FIG. 4A) has a start timestamp of 0.000008 ms, a stop timestamp of 0.203232 ms, and a duration or delta of 0.203224 ms. The ability exchange step "AN_ABL" (corresponding to step 404 in FIG. 4A) has a start timestamp of 0.203240 ms, a stop timestamp of 67.311760 ms, and a duration of 67.108520 ms. The auto negotiation checking step "AN_CHK" (corresponding to step 406 in FIG. 4A) has a start timestamp of 0.000000 ms, a stop timestamp of 0.008328 ms, and a duration or delta of 0.008328 ms. In this example, the timer 246 was reset at the start of AN_CHK, but such resetting of the timer is not required. These timer values represent an exemplary capture of the Ethernet link bring-up. These timer values will vary each time the device resets and can also vary with the Link partner (i.e., the remote device).

One of the more important parameters is the data bus technologies supported by each link partner, which determines the maximum data rate at which the link can be operated. Portion 454 lists the data bus technologies supported by each link partner and also the data bus technology that is selected for optimal link performance. In the example of FIG. 4B, the local device supports 10GBASE-KR (as defined by IEEE 802.3ap), whereas the remote device supports both 10GBASE-KR and 1000BASE-KX. The final selected technology at the end of auto negotiation is the overlapping data rate standard, which is 10GBASE-KR. In scenarios where there are two or more common data rate standards, the highest data rate is selected Portions 456-1 and 456-2 show more detailed device parameters contained within the Ethernet packets received and sent by Ethernet block 212. In particular, portion 456-1 lists device parameters in packets received at the local device from the remote device, whereas portion 456-2 lists device parameters in packets sent by the local device to the remote device.

A first subset of bits in the packet (e.g., bits FEC[47:46]) indicates whether the device supports forward error correction (FEC). Forward error correction is only enabled when both link partners support FEC.

A second subset of bits in the packet (e.g., bits AN_Tech [29:21]) indicates what networking technologies or data rates are supported by the device.

A third subset of bits in the package (e.g., bits TX_Nonce [20:16]) is a 5-bit wide field containing a random or pseudo-random number that is generated for each entry to the ability detect state. The transmitted nonce should have a uniform distribution in the range from zero to (2^5−1) assuming a 5-bit implementation. The method used to generate the random value should be designed to minimize correlation to the values generated by other communications protocol blocks.

A fourth subset of bits in the packet (e.g., bit Next_Page [15]) indicates whether any other pages are needed in addition to the base page for auto negotiation. If the next page bit is asserted, then additional pages will have to be exchanged and analyzed before completing auto negotiation.

A fifth subset of bits in the packet (e.g., bit Ack[14]) indicates whether the link partner has acknowledge the AN completion. This acknowledgement bit should only be asserted after both link partners has determined the common device capabilities.

A sixth subset of bits in the packet (e.g., bit Remote_Fault [13]) indicates fault at the receiver of the remote device. This will be used for upper management layers to take appropriate action.

A seventh subset of bits in the packet (e.g., bits Pause_Ability[12:10]) indicates whether or not the device is capable of sending placeholder data to help maintain the link during idle periods.

An eighth subset of bits in the packet (e.g., bits Echoed_Nonce[9:5]) is a 5-bit wide field containing the nonce received from the link partner. When the Ack bit is set to zero, the echoed nonce field is set to logic zeros. When the Ack bit is set to one, the echoed nonce field will contain the value received in the TX_Nonce field from the link partner.

A ninth subset of bits in the packet (e.g., bits Selector_Field[4:0]) indicates whether or not the device is compliant with a given computer bus standard (e.g., the IEEE 802.3 specification). Both the local and remote device should be compliant with the given bus standard.

The various parameters described above are merely representative of several parameters in the IEEE 802.3 Ethernet protocol and are not intended to limit the scope of the presented embodiments. If desired, protocol analyzer tool 242 may also display other parameters in the IEEE 802.3 specification or parameters associated with other computer bus technologies.

Referring to portions 456-1 and 456-2 of FIG. 4B, all of the device parameters or fields are initially reset to default values (e.g., bit value 0x0) during the AN reconfiguration step AN_RC.

During the device ability exchange step AN_ABL, the local device may receive a base page at timestamp 0.204352 ms (corresponding to step 412) and may send a base page at timestamp 67.266648 ms (corresponding to step 414). Comparing the parameters of the received base page with the transmitted base page, most of the parameters in this example are matching other than the AN_Tech bits. AN_Tech of 0x5 may indicate that the remote device is capable of supporting 10GBASE-KR and 1000BASE-KX, whereas AN_Tech of oxo may indicate that the local device is capable of supporting 10GBASE-KR.

During the auto negotiation checking step AN_CHK, the local device may detect or determine the common device capabilities to use in operating the link. The link performance will be constrained by the parameters of the less capable link partner (e.g., the device with the slower data rate capability). Thereafter, the local device and the remote device may send an acknowledgement to each other. When both Ack[14] bits are high, then auto negotiation mode 304 is complete.

Figure 5A:
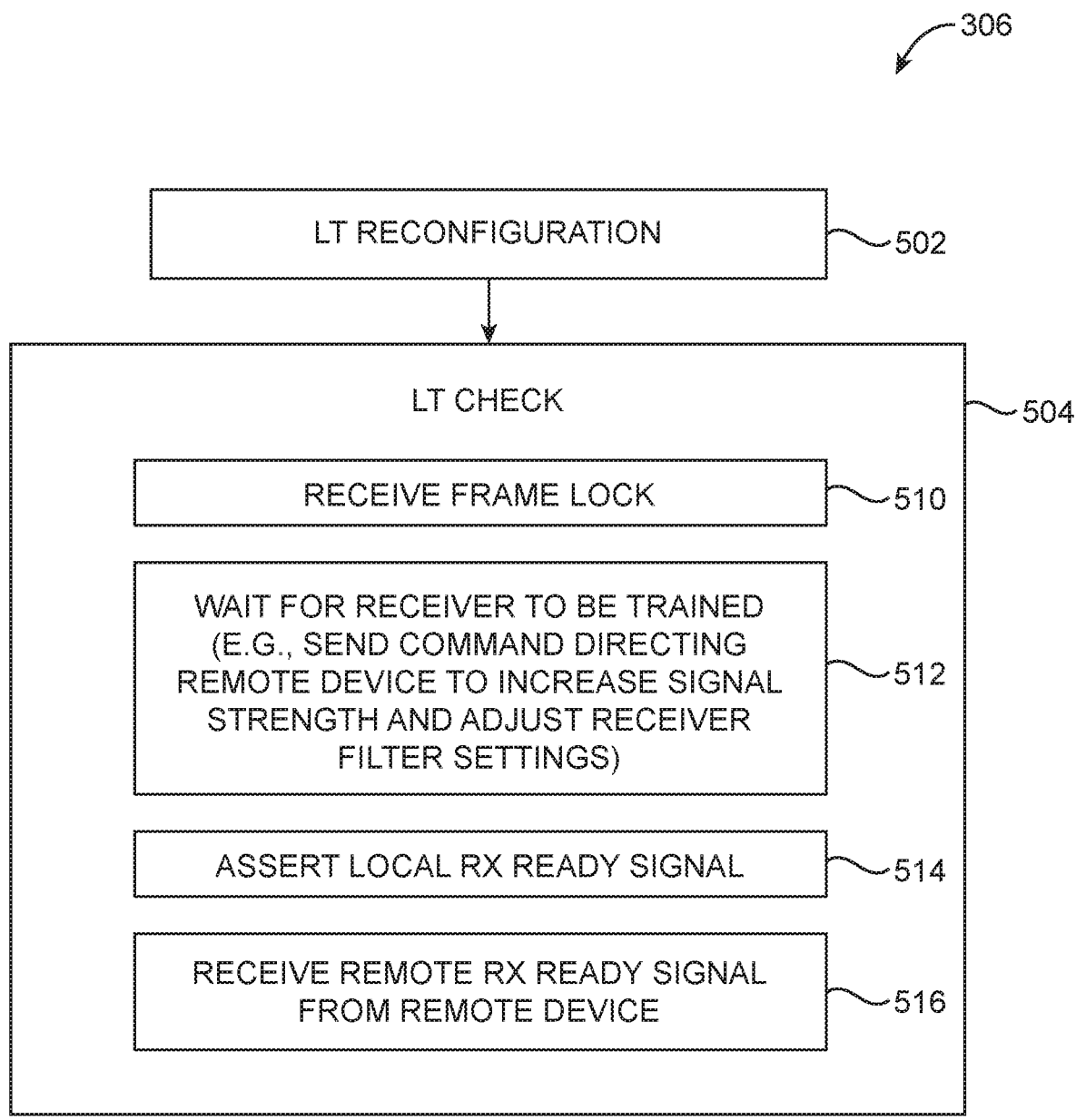
FIG. 5A is a flow chart of illustrative internal states that a communications protocol block steps through during a link training (LT) mode in accordance with an embodiment.

FIG. 5A is a flow chart of internal states that Ethernet block 212 steps through during link training (LT) mode 306. At step 502, Ethernet block 212 may perform link training (LT) reconfiguration (e.g., by programming Ethernet PHY 216 for subsequent link training operations).

At step 504, Ethernet block 212 may perform link training (LT) check. At sub-step 510, Ethernet block 212 may acquire frame lock. At sub-step 512, block 212 may train its receiver (e.g., by sending commands directing the remote device to increase its signal strength and by adjusting receiver equalization settings to optimize signal quality. At sub-step 514, block 212 may assert a local receive (RX) ready signal. At sub-step 516, block 212 may receive a remote RX ready signal from the remote device. In certain scenarios, block 212 may receive the remote RX ready signal before sending the local RX ready signal (i.e., sub-steps 514 and 516 can be swapped). Other suitable steps for performing link training may also be included, if desired.

Figure 5B:
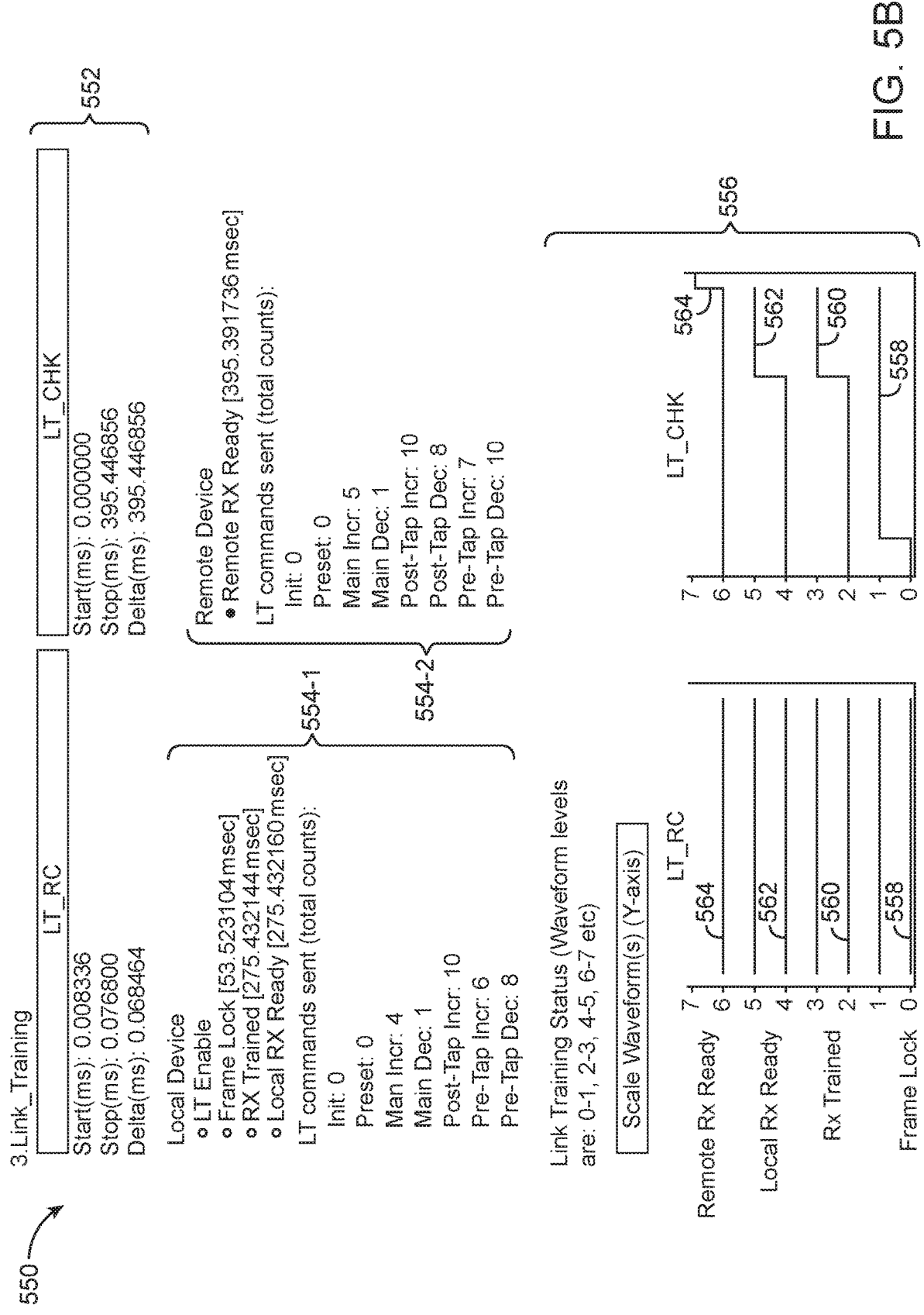
FIG. 5B is a diagram of an illustrative user interface that displays timing information of communication packets and key parameters associated with each state of the link training mode in accordance with an embodiment.

Protocol analyzer tool 242 may be configured to provide accurate and useful timing information associated with each step of LT mode 306 (see, e.g., user interface 550 of FIG. 5B). As illustrated in FIG. 5B, portion 552 shows the high-level timing information associated with each of the two steps of link training. These 2 steps are device internal states of Ethernet block 212 and collectively maps to the Link Training mode as defined by the IEEE 802.3 specification. The LT reconfiguration step "LT_RC" (corresponding to step 502 in FIG. 5A) has a start timestamp of 0.008336 ms (continuing directly from the end of AN_CHK), a stop timestamp of 0.076800 ms, and a duration or delta of 0.068464 ms. The LT check step "LT_CHK" (corresponding to step 504 in FIG. 5A) has a start timestamp of 0.000000 ms, a stop timestamp of 395.446856 ms, and a duration of 395.446856 ms. In this example, timer 246 was reset at the start of LT_CHK, but such resetting of the timer is not required.

Portion 554-1 of interface 550 lists additional timing information for events at the local device during LT_CHK. In the example of FIG. 5B, the local device acquires frame lock at timestamp 53.523104 ms, completes receiver training at timestamp 275.432144 ms, and immediately asserts the local RX ready signal at timestamp 275.432160 ms. Listed below the timing data are the various commands the local device sent to the remote device (e.g., commands for adjusting equalization filter settings such as incrementing or decrementing tap settings for a finite impulse response filter).

Portion 554-2 of interface 550 lists additional timing information for events at the remote device during LT_CHK. In the example of FIG. 5B, the remote device asserts the remote RX ready signal much later at timestamp 395.391736 ms. Link training is complete only when the local RX ready signal and the remote RX ready signal are both asserted (e.g., when both the local and remote RX ready signals are driven high). Listed below the timing data are the various commands the remote device sent to the local device (e.g., commands for adjusting filter settings such as incrementing or decrementing tap settings for a finite impulse response filter).

Portion 556 of interface 550 shows timing diagrams to further assist the user in analyzing key events during link training. Waveform 558 represents the frame lock indicator (i.e., whether or not frame lock has been acquired). Waveform 560 represents the RX trained indicator (i.e., whether or not the receiver has been trained). Waveform 562 represents the local RX ready signal. Waveform 564 represents the remote RX ready signal. During LT_RC, all the waveforms are low. During LT_CHK, the frame lock waveform 558 is first asserted. Some time later, the RX trained indicator waveform 560 goes high, which then triggers assertion of the local RX ready signal 562. At some even later time, the remote RX ready signal 564 goes high, which marks the completion of link training mode 306.

Figure 6A:
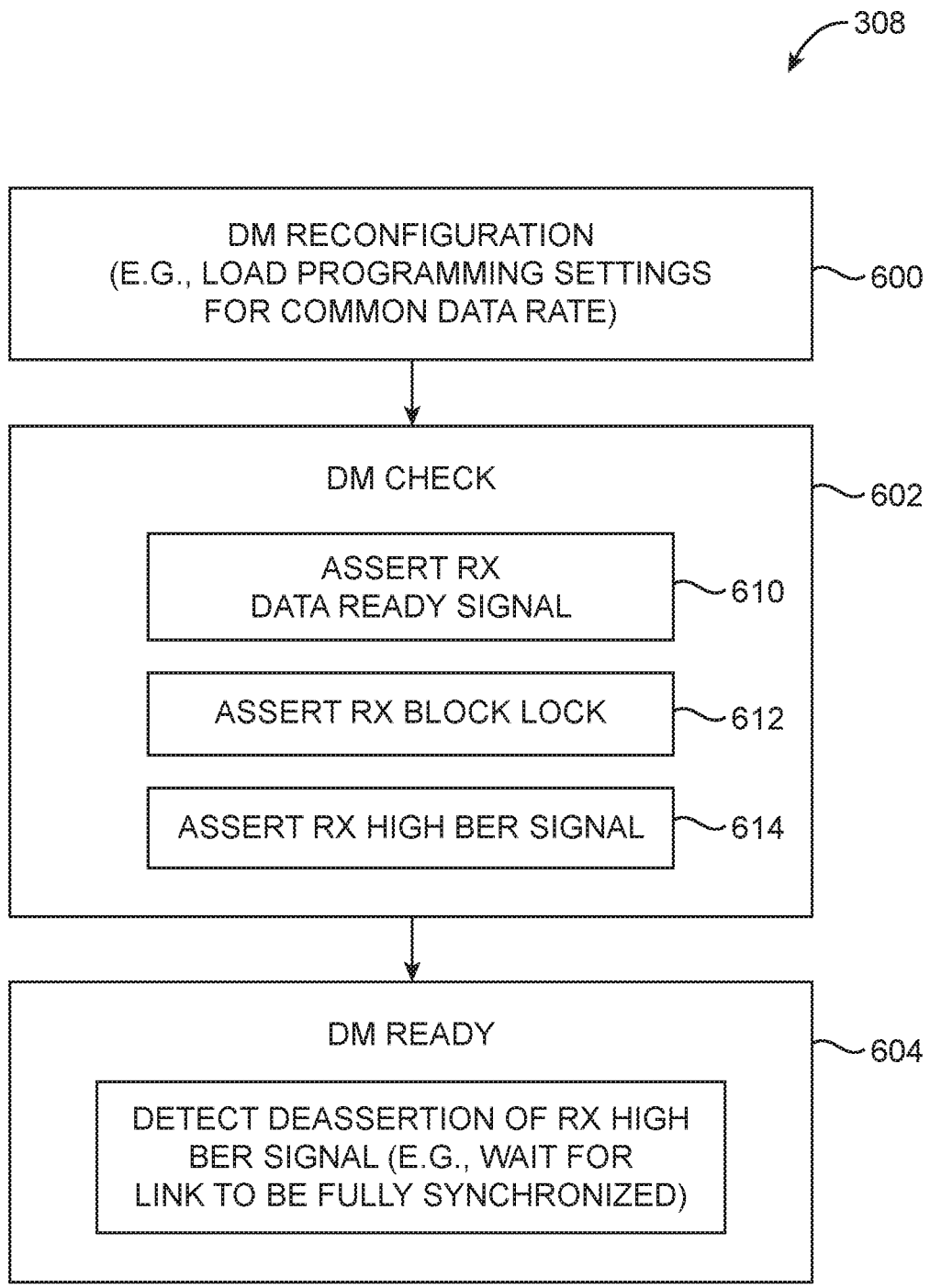
FIG. 6A is a flow chart of illustrative internal states that a communications protocol block steps through during a data mode in accordance with an embodiment.

FIG. 6A is a flow chart of illustrative steps performed during data mode (DM) 308 of link sequencer state machine 300. At step 600, Ethernet block 212 may perform data mode (DM) reconfiguration (e.g., by loading programming settings for the common data rate detected during auto negotiation).

At step 602, Ethernet block 212 may perform data mode (DM) check. At sub-step 610, block 212 may assert RX data ready signal, which means that the local device is ready to receive Ethernet packets. At sub-step 612, block 212 may assert an RX block lock signal, which indicates that the local device is locked to the 64/66b word boundary. At sub-step 614, block 212 may assert an RX high bit error rate (BER) signal. The RX high BER signal, when asserted, indicates that the link is currently exhibits high BER.

At step 604, block 212 may detect when the RX high BER signal is deasserted. The RX high BER signal, when deasserted, indicates that the link is currently exhibiting sufficiently low BER and is fully synchronized. Once the RX high BER signal is deasserted, data mode 308 is fully active, and the link is now ready to transfer Ethernet packets during normal user operation.

Figure 6B:
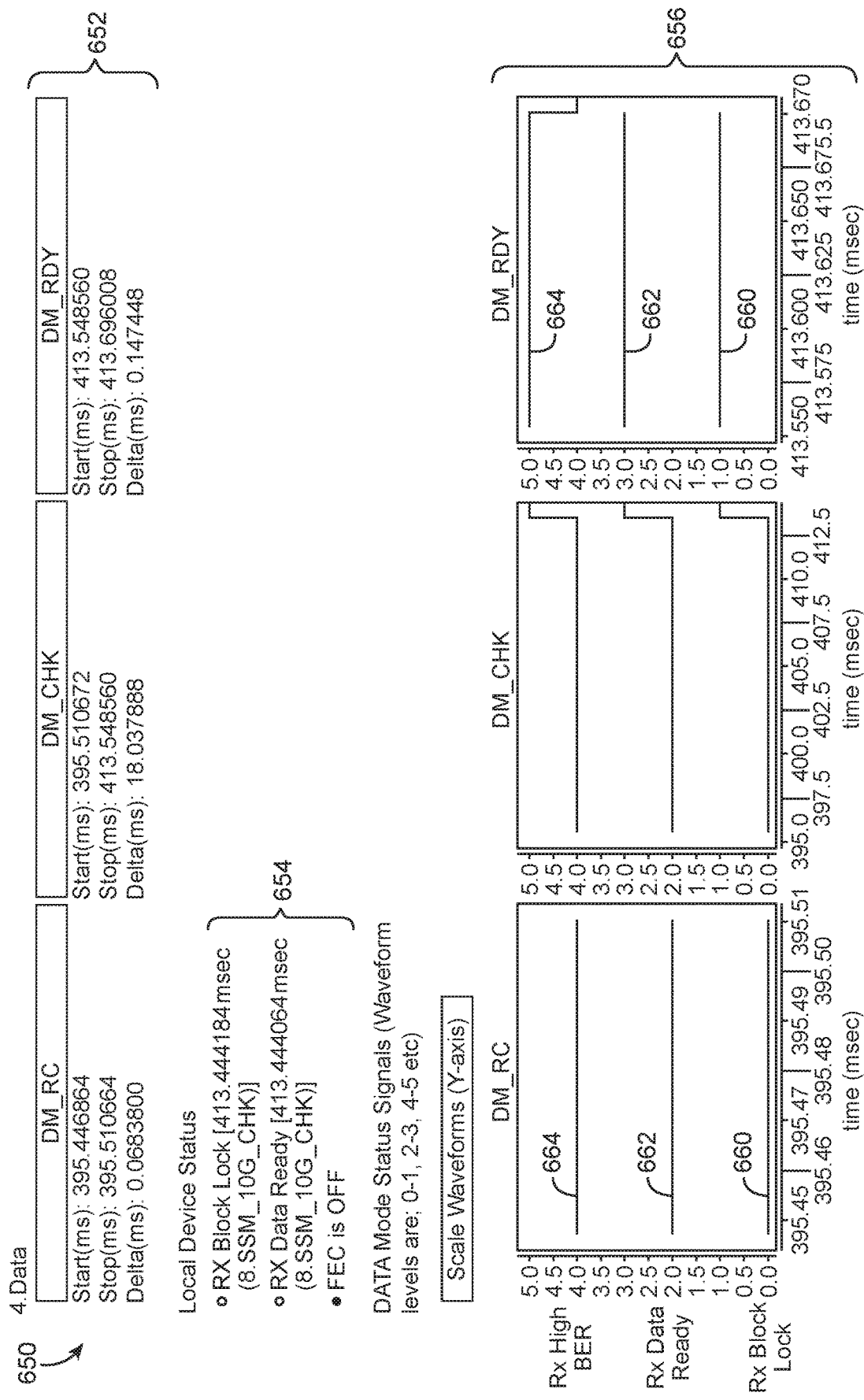
FIG. 6B is a diagram of an illustrative user interface that displays timing information and key parameters associated with each state of the data mode in accordance with an embodiment.

Protocol analyzer tool 242 may be configured to provide accurate and useful timing information associated with each step of data mode 308 (see, e.g., user interface 650 of FIG. 6B). As illustrated in FIG. 6B, portion 652 shows the high-level timing information associated with each of the three steps of data mode 308. These 3 steps are device internal states of Ethernet block 212 and collectively maps to the Data Mode as defined by the IEEE 802.3 specification. The DM reconfiguration step "DM_RC" (corresponding to step 600 in FIG. 6A) has a start timestamp of 395.446864 ms (continuing directly from the end of LT_CHK), a stop timestamp of 395.510664 ms, and a duration or delta of 0.063800 ms. The DM check step "DM_CHK" (corresponding to step 602 in FIG. 6A) has a start timestamp of 395.510672 ms, a stop timestamp of 413.548560 ms, and a duration of 18.037888 ms. The DM ready step "DM_RDY" (corresponding to step 604 in FIG. 6A) has a start timestamp of 413.548560 ms, a stop timestamp of 413.696008 ms, and a duration of 0.147448 ms.

Portion 654 of interface 650 lists additional timing information for events at the local device during DM_CHK. In the example of FIG. 6B, the local device asserts RX block lock at timestamp 413.444184 ms, which immediately triggers assertion of the RX data ready signal at timestamp 413.444064 ms.

Portion 656 of interface 650 shows timing diagrams to further assist the user in analyzing key events during data mode. Waveform 660 represents the RX block lock indicator (i.e., whether or not block lock has been acquired). Waveform 662 represents the RX data ready signal. Waveform 664 represents the RX high BER signal. During DM_RC, all the waveforms are low. At the end of DM_CHK, the block lock indicator 660 is first asserted. This triggers assertion of the RX data ready signal 662. Thereafter, the RX high BER signal is also asserted. At the end of DM_RDY, the RX high BER signal is deasserted, so the link is fully synchronized and can start transferring user packets.

FIG. 7 is a diagram of a top-level user interface 700 that lists the key timing information for each step in the link sequencer state machine, which maps directly to the various modes defined by the IEEE 802.3 specification (FIG. 3). As shown in FIG. 7, portion 702 shows the start and stop timestamps and the duration for initialization mode 302. Portion 704 shows the start and stop timestamps and the durations for steps AN_RC, AN_ABL, and AN_CHK for auto negotiation mode 304. Portion 706 shows the start and stop timestamps and the durations for steps LT_RC and LT_CHK for link training mode 306. Portion 708 shows the start and stop timestamps and the durations for steps DM_RC, DM_CHK, and DM_RDY for data mode 308.

Organizing the high-level timing data into a single interface 700 can help the user better diagnose the overall timing sequence. For example, the user can compare the timing delta of each step to typical or expected durations and make an educated guess as to whether an error might have occurred during that step. If link sequencer state machine 300 never makes it past a certain step, such link failure will also be evident from user interface 700.

Figure 8:
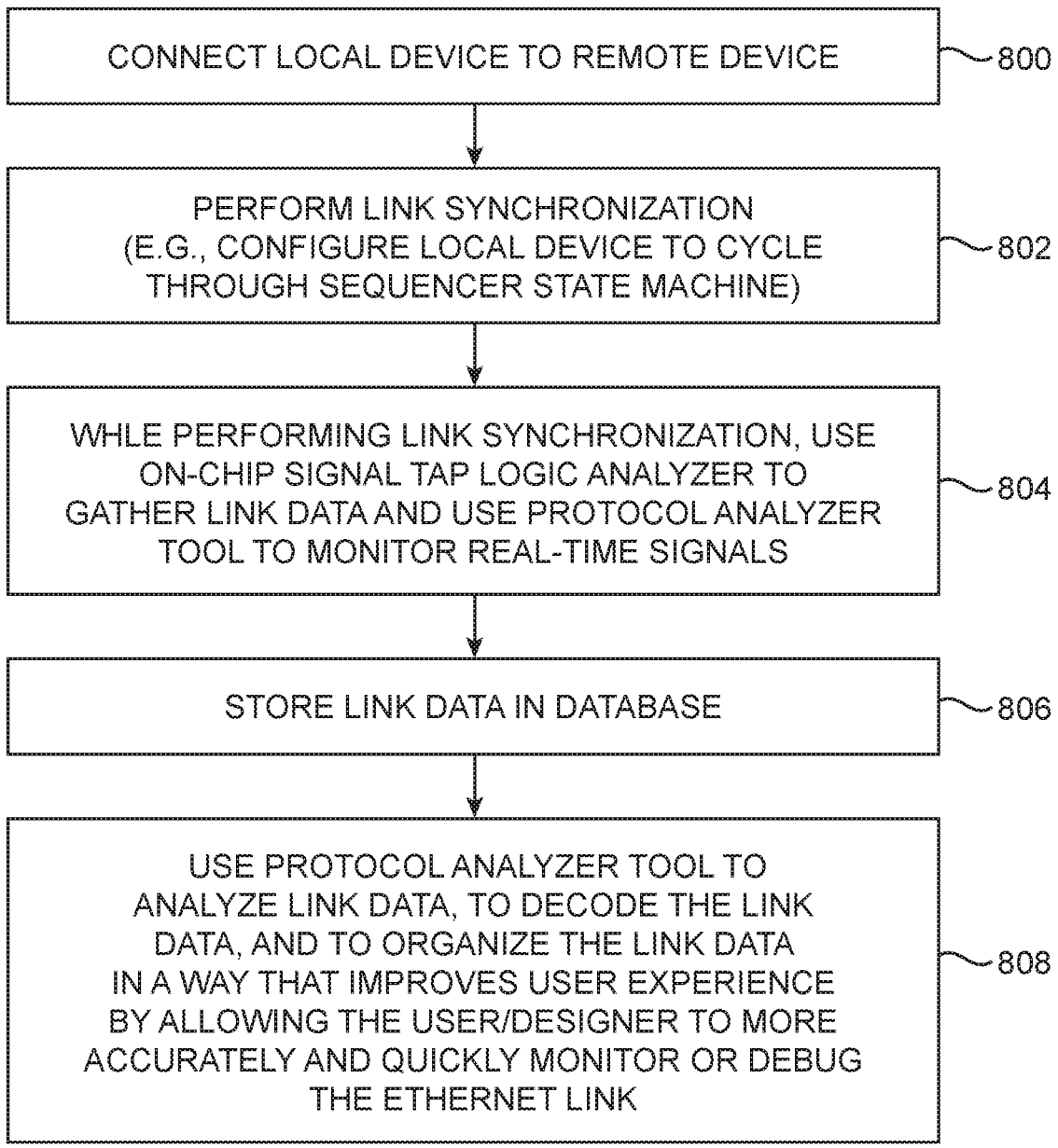
FIG. 8 is a flow chart of illustrative steps for operating a protocol analyzer tool to monitor and debug a high-speed communications link in accordance with an embodiment.

FIG. 8 is a flow chart of illustrative steps for operating protocol analyzer tool 242 to monitor and debug a high-speed communications link (e.g., an Ethernet link, PCIe link, Interlaken link, CPRI link, or other high-speed serial communications link).

At step 800, a local device may be connected to a remote device. At step 802, the local and remote devices may perform link bring-up (e.g., the local device may be configured to cycle through the various modes of a link sequencer state machine such as state machine 300 of FIG. 3).

At step 804, an on-chip signal tap analyzer on the local device may be used to gather link data during link bring-up. During step 804, the link monitor function 246 of protocol analyzer tool 242 may also be used to read real-time status signals from communications protocol block 212.

Figure 10A:
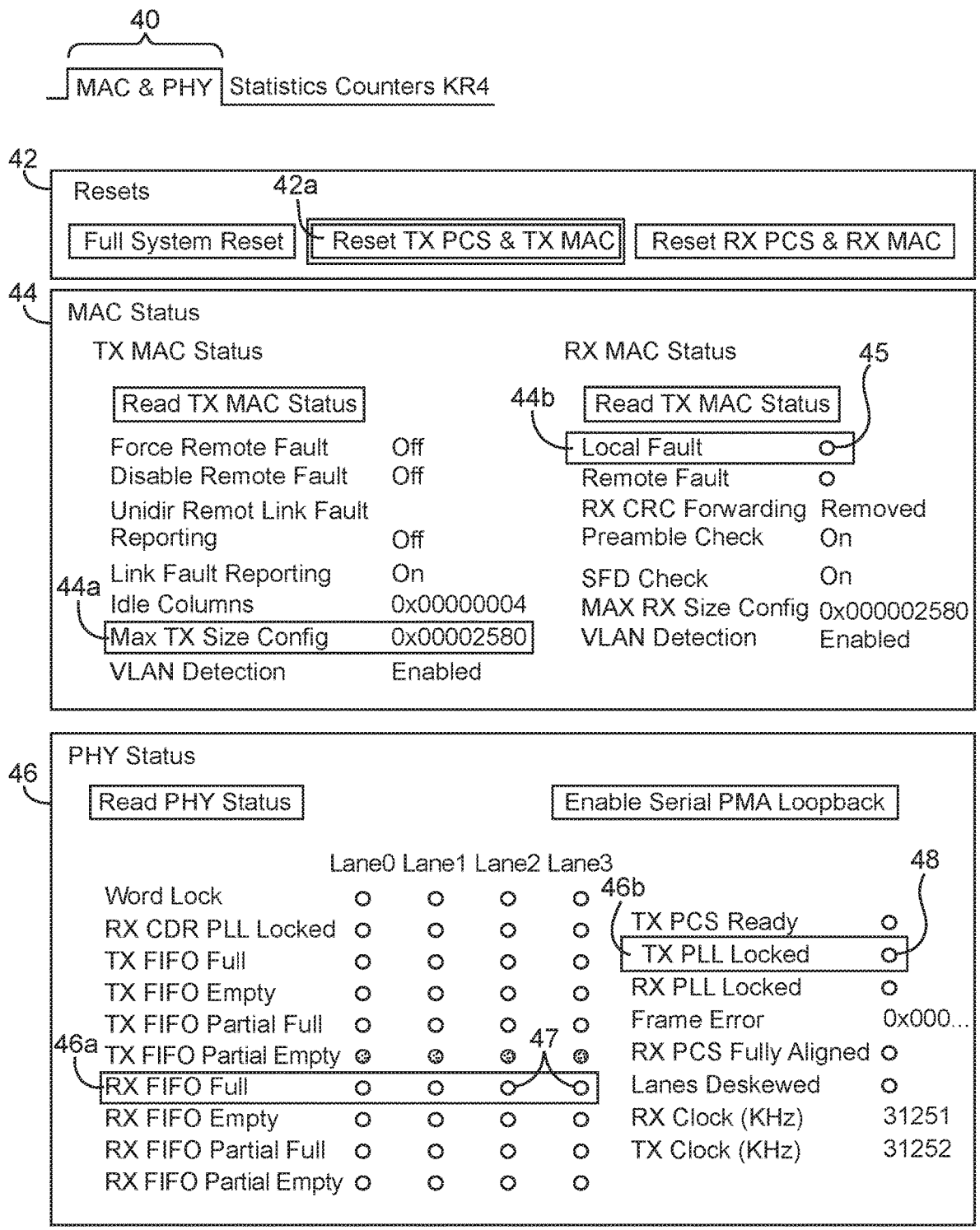
Figure 10C:
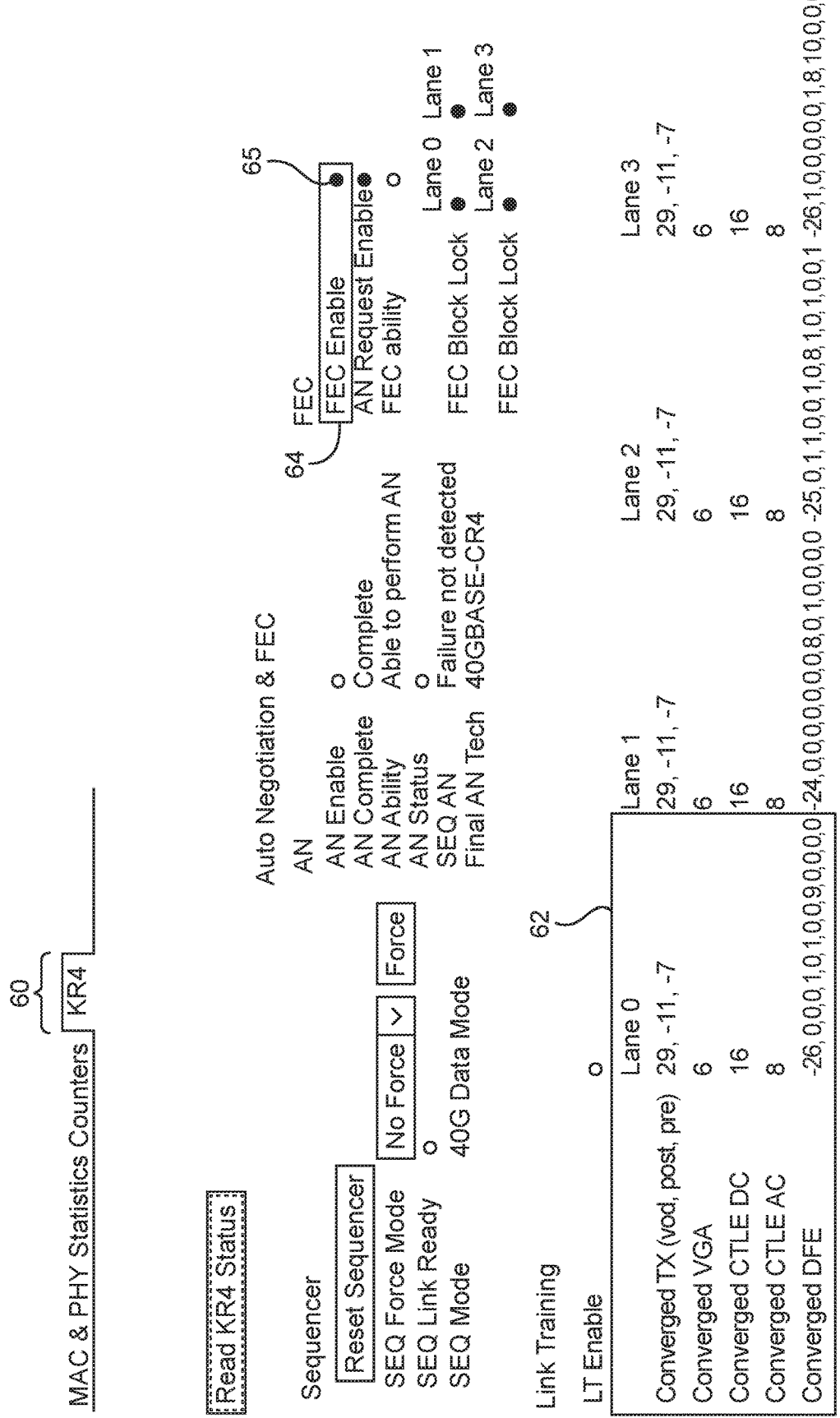

FIGS. 10A-10C show illustrative user interfaces that display real-time status information during link bring-up for an Ethernet link (as an example). In particular, the link monitor 246 may continuously read and display all of the required status registers related to the Ethernet link and helps to ensure that all of the Ethernet link statuses at various stages of link bring-up are valid. In case of a failure, the link monitor is capable of determining the type of failure based on the value of the various status bits.

FIG. 10A shows an illustrative user interface of a first tab 40 of link monitor 246, which displays high-level status information for the MAC/PHY components. For example, portion 42 includes various reset options. Option 42a can be selected to reset the transmitter PCS and MAC blocks. Other options might include the ability to reset the receiver PCS and MAC blocks, to perform a full system reset, and/or other types of suitable reset operations.

Portion 44 displays the MAC status such as the configuration of the transmitter and receiver MAC blocks. As an example, line 44a displays the maximum transmitter packet size configuration (e.g., set to 0x00002580 here). As another example, line 44b indicates whether a local fault is present (e.g., a green status indicator 45 might indicate that no fault is detected while a red status indicator 45 would indicate that a local fault is detected). Portion 44 may also include other TX/RX MAC status information such as whether "Remote Fault" is turned on, the size of idle columns, whether "Preamble Check" is turned on, whether virtual local area network (VLAN) detection is enabled, etc.

Portion 46 displays the PHY status such as the status of the physical-layer sub-components including transmit/receiver first-in first-out (FIFO) circuits, phase-locked loops (PLLs), clock signals, etc. As an example, line 46a displays whether the RX FIFO is full in lanes 0-3 (e.g., green status indicators 47 might indicate that the FIFO is not full while a red status indicator 47 would indicate that the FIFO is full). As another example, line 46b indicates whether the transmitter PLL is locked (e.g., a green status indicator 48 might indicate that the PLL is successfully locked, whereas a red status indicator 48 would indicate that the PLL is not locked). Portion 46 may also include other PHY status information such as whether the TX/RX FIFOs are empty, partially empty, or partially full, whether the lanes are deskewed, the TX/RX clock speeds, etc.

FIG. 10B shows an illustrative user interface of a second tab 50 of link monitor 246, which displays TX/RX statistics counter information such as the number of packets transmitted and received and also the associated error count. As an example, line 52 indicates the number of transmitted frames having a frame size between 128 and 255 bytes. As another example, line 54 indicates the number of received frames with errors (e.g., which is 0 here).

FIG. 10C shows an illustrative user interface of a third tab 60 of link monitor 246, which displays the status of the link sequencer state machine. As an example, portion 62 display equalizer parameter values for lane 0 after link training has successfully completed. As another example, line 64 indicates a Forward Error Correction (FEC) feature configuration status (e.g., a green status indicator 65 might indicate that FEC is enabled, whereas a red status indicator 65 would indicate that FEC is disabled). In general, tab 60 may also display whether AN is complete, the data bus technology that is selected for optimal link performance, whether FEC block lock has been done for lanes 0-3, etc.

The link monitor user interfaces of FIG. 10A-10C displaying real-time status information during link bring-up are merely illustrative and does not serve to limit the scope of the present embodiments. In general, other types of monitoring live signal behavior can be implemented.

Referring back to FIG. 8, the link data gathered by the on-chip signal tap analyzer may be stored in local memory (at step 806).

At step 808, protocol analyzer tool 242 may retrieve the link data from the local memory and may analyze the link data. Protocol analyzer tool 242 may decode the link data and organize the link data in a way that improves user experience by allowing the user/designer to more accurately and quickly monitor or debug the communications link (e.g., the user can now more quickly and precisely isolate the point of failure by looking at the timing information for each internal state of the local device without having to inspect the hundreds or thousands of raw signals waveforms gathered by the signal tap logic analyzer).

Organizing the link data in accordance with the various modes defined by a standard protocol specification provides transparency into the internal state behavior of the local device during link bring-up operations. This enables users and manufacturers of the overall communications system to talk using a common language (e.g., using IEEE 802.3 terminology), helps avoid finger-pointer between the various parties, and reduces service requests to the manufacturer.

The embodiments of FIGS. 2-8 directed to analyzing and debugging an Ethernet communications link is merely illustrative and is not intended to limit the scope of the present embodiments. In general, the techniques described herein may be extended and applied to the PCIe protocol, the Interlaken protocol, the CPRI protocol, the OBSAI protocol, the SMPTE protocol, and/or other high-speed serial computer bus protocols capable of transferring data at more than 1 Gbps, more than 10 Gbps, more than 100 Gbps, etc.

Figure 9:
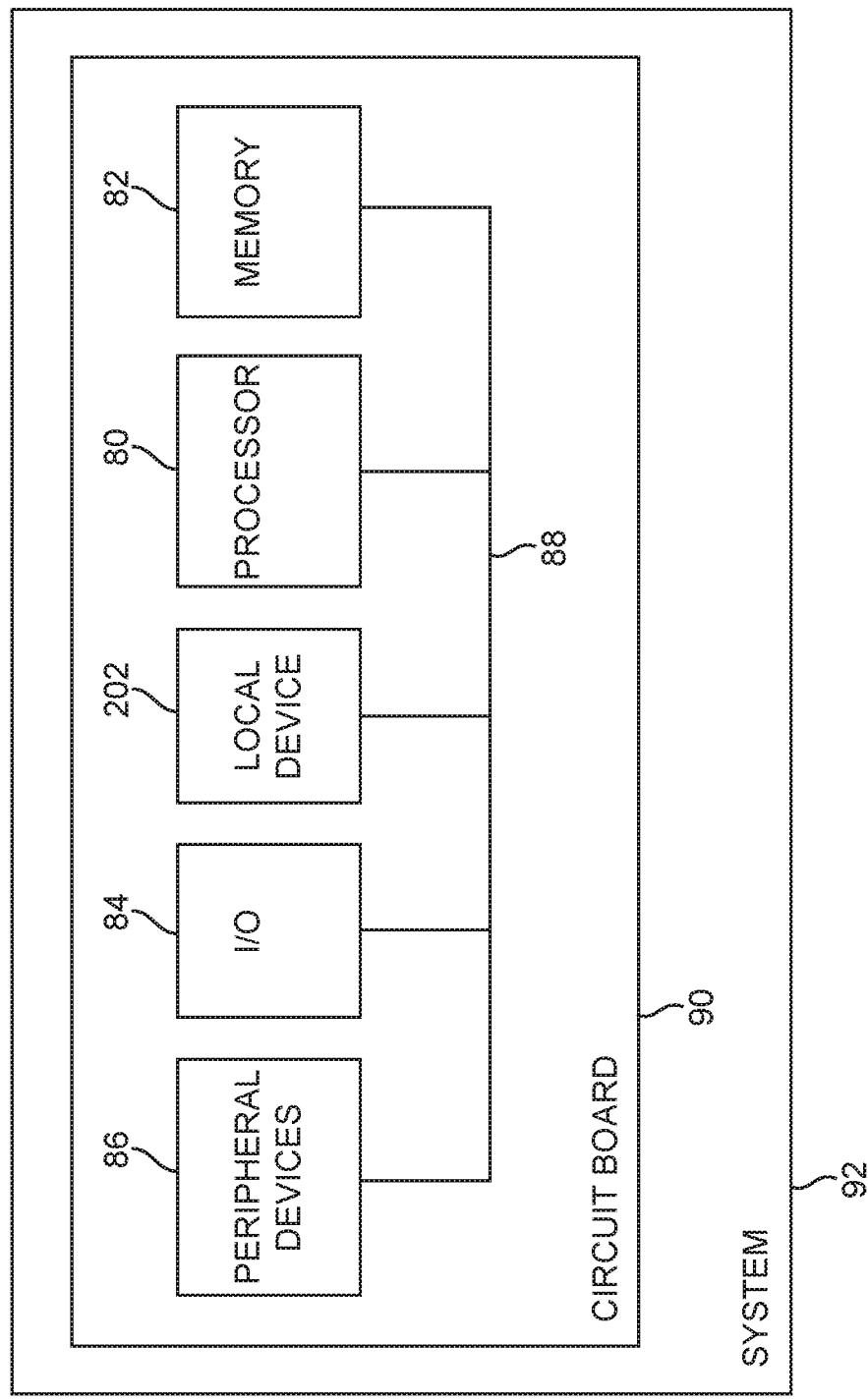
FIG. 9 is a diagram of an illustrative system in which the local device of the present embodiments may be used.

The foregoing embodiments may be made part of a larger system. FIG. 9 shows local device 202 (i.e., a local device operable to perform link synchronization with a remote device) in use in data processing system 92. Data processing system 92 may include one or more of the following components: a processor 80 (e.g., a central processing unit or CPU), memory 82 or any suitable type of computer-readable media for storing data or program code, I/O circuitry 84, and peripheral devices 86. These components are coupled together by a system bus 88 and may populate a circuit board 90 that is contained in system 92.

System 92 may be a digital system or a hybrid system that includes both digital and analog subsystems. System 92 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

EXAMPLES

The following examples pertain to further embodiments.

Example 1 is an integrated circuit device, comprising: processing circuitry; a communications protocol block coupled to the processing circuitry, wherein the communications protocol block is configured to communicate with a remote device in accordance with a communications protocol specification; and a logic debugging circuit configured to gather signals from the communications protocol block while the integrated circuit device communicates with the remote device, wherein the integrated circuit device is debugged by a protocol analyzer tool configured to retrieve the gathered signals and to decode the retrieved signals by mapping the retrieved signals to a plurality of modes defined by the communications protocol specification.

Example 2 is the integrated circuit device of example 1, wherein the protocol analyzer tool is optionally configured to debug the integrated circuit device during link bring-up operations or during normal operation of the integrated circuit device.

Example 3 is the integrated circuit device of any one of examples 1-2, wherein the protocol analyzer tool is optionally implemented on either the integrated circuit device or on a host device that is separate from the integrated circuit device.

Example 4 is the integrated circuit device of any one of examples 1-3, wherein the protocol analyzer tool is optionally further configured to retrieve real time status information directly from the communications protocol block while the communications protocol block communicates with the remote device.

Example 5 is the integrated circuit device of any one of examples 1-4, wherein the protocol analyzer tool is optionally further configured to provide timing information associated with various internal device states of the protocol communications block for each mode in the plurality of modes defined by the communications protocol specification.

Example 6 is the integrated circuit device of any one of examples 1-5, wherein the communications protocol specification optionally comprises a communications standard selected from the group consisting of: Ethernet, Peripheral Component Interconnect Express (PCIe), Interlaken link, Common Public Radio Interface (CPRI), Open Base Station Architecture Initiative (OBSAI) link, Serial RapidIO, and Society of Motion Picture and Television Engineers (SMPTE).

Example 7 is the integrated circuit device of any one of examples 1-6, wherein the integrated circuit device is optionally part of a selected one of: a datacenter, a computer networking system, a data networking system, a digital signal processing system, a graphics processing system, a video processing system, a computer vision processing system, a cellular base station, a virtual reality system, an augmented reality system, a network functions virtualization platform, an artificial neural network, and an autonomous driving system.

Example 8 is a method of debugging a communications link between a local device and a remote device, the method comprising: using the local device to communicate with the remote device; while the local device is communicating with the remote device, using an embedded signal debugger tool within the local device to gather signal waveforms; and with a protocol analyzer tool, decoding the signal waveforms to provide transparency into internal device state behaviors of the local device and mapping the internal device state behaviors to corresponding protocol specifications and protocol terminologies.

Example 9 is the method of example 8, wherein the protocol specifications and terminologies are optionally selected from one of: an Ethernet standard, a Peripheral Component Interconnect Express (PCIe) standard, an Interlaken standard, a Common Public Radio Interface (CPRI) standard, an Open Base Station Architecture Initiative (OBSAI) standard, a Serial RapidIO standard, and a Society of Motion Picture and Television Engineers (SMPTE) standard.

Example 10 is the method of any one of examples 8-9, optionally further comprising providing timestamp information for the internal device state behaviors.

Example 11 is the method of example 10, wherein providing the timestamp information optionally comprises providing a start timestamp and a stop timestamp for each state associated with the internal device state behaviors.

Example 12 is the method of example 10, wherein the protocol specifications define a plurality of modes, and wherein providing the timestamp information optionally comprises providing start and stop timestamps for each of the defined modes.

Example 13 is the method of any one of examples 8-12, optionally further comprising: with the protocol analyzer tool, listing at least one communications standard supported by the local device; with the protocol analyzer tool, listing at least one communications standard supported by the remote device; and with the protocol analyzer tool, determining a common communications standard by comparing the at least one communications standard supported by the local device with the at least one communications standard supported by the remote device.

Example 14 is the method of any one of examples 8-13, optionally further comprising: with the protocol analyzer tool, listing device parameters associated with the local device; and with the protocol analyzer tool, listing device parameters associated with the remote device.

Example 15 is the method of example 8, optionally further comprising: with the protocol analyzer tool, providing timestamp information indicating when a first set of signals is asserted at the local device; and with the protocol analyzer tool, providing timestamp information indicating when a second set of signals is asserted at the remote device.

Example 16 is a system, comprising: a local device; a remote device couple to the local device via a communications link, wherein the local device comprises a communications protocol block and a signal debugging block configured to gather signals from the communications protocol block while the local device is communicating with the remote device; and a host device, wherein a protocol analyzer tool operable to run on the host device is configured to retrieve the signals gathered using the signal debugging block and to decode the retrieved signals by mapping the retrieved signals to a plurality of modes defined in a communications protocol specification associated with the communications protocol block.

Example 17 is the system of example 16, wherein the protocol analyzer tools is optionally further configured to retrieve real time status information directly from the communications protocol block while the communications protocol block is performing link bring-up operations with the remote device.

Example 18 is the system of any one of examples 16-17, wherein the local device optionally further comprises: a memory block configured to store the signals gathered using the signal debugging block.

Example 19 is the system of any one of examples 16-18, wherein the protocol analyzer tool is optionally further configured to provide timing information associated with various internal device states of the protocol communications block for each mode in the plurality of modes defined by the communications protocol specification.

Example 20 is the system of any one of examples 16-19, wherein the protocol analyzer tool optionally decodes the retrieved signals without having to attach any external protocol decoder equipment to the communications link.

Example 21 is a non-transitory computer-readable storage medium comprising instructions to: retrieve signals from memory, wherein a link sequencer state machine directs a local device to communicate with a remote device, and wherein the signals are gathered while the local device communicates with the remote device; decode the retrieved signals by mapping the retrieved signals to each state in the link sequencer state machine; and display timing information for each state in the link sequencer state machine.

Example 22 is the non-transitory computer-readable storage medium of example 21, optionally further comprising instructions to: map each state in the link sequencer state machine to corresponding protocol specifications and terminologies.

Example 23 is the non-transitory computer-readable storage medium of any one of examples claim 21-22, wherein the instruction to retrieve the signals from the memory optionally comprises instruction to import at least one hundred signal waveforms gathered using an embedded signal debugging engine in the local device.

Example 24 is the non-transitory computer-readable storage medium of any one of examples 21-23, optionally further comprising instructions to: display a first timestamp indicating when a first data packet is received at the local device; and display a second timestamp indicating when a second data packet is received at the remote device.

Example 25 is the non-transitory computer-readable storage medium of any one of examples 21-24, optionally further comprising instructions to: display a list of device capabilities associated with the local device; and display a list of device capabilities associated with the remote device.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A method comprising:
using a communications protocol block in an integrated circuit device to communicate with a remote device in accordance with a communications protocol specification;
gathering signals from the communications protocol block with a logic debugging circuit in the integrated circuit device while the integrated circuit device communicates with the remote device; and
debugging the integrated circuit device with a protocol analyzer tool configured to retrieve the gathered signals and to provide timing information associated with internal device states of the communications protocol block that map to a plurality of link bring-up modes defined by the communications protocol specification.

2. The method of claim 1, wherein the plurality of link bring-up modes comprise an auto negotiation mode during which the integrated circuit device and the remote device exchange and choose common device capabilities.

3. The method of claim 1, wherein the plurality of link bring-up modes comprise a data transmission mode during which data is exchanged between the integrated circuit device and the remote device.

4. The method of claim 1, wherein the plurality of link bring-up modes comprise a link training mode during which the integrated circuit device and the remote device adjust signal transmission strength.

5. An integrated circuit device, comprising:
a communications protocol block configured to communicate with a remote device in accordance with a communications protocol specification; and
a logic debugging circuit configured to gather signals from the communications protocol block while the integrated circuit device communicates with the remote device, wherein the integrated circuit device is debugged by a protocol analyzer tool configured to retrieve the gathered signals and to provide timing information associated with internal device states of the communications protocol block that map to a plurality of link bring-up modes defined by the communications protocol specification.

6. The integrated circuit device of claim 5, wherein the protocol analyzer tool is configured to debug the integrated circuit device during link bring-up operations or during normal operation of the integrated circuit device.

7. The integrated circuit device of claim 5, wherein the protocol analyzer tool is implemented on either the integrated circuit device or on a host device that is separate from the integrated circuit device.

8. The integrated circuit device of claim 5, wherein the protocol analyzer tool is further configured to retrieve real time status information directly from the communications protocol block while the communications protocol block communicates with the remote device.

9. The integrated circuit device of claim 5, wherein the communications protocol specification comprises a communications standard selected from the group consisting of: Ethernet, Peripheral Component Interconnect Express (PCIe), Interlaken link, Common Public Radio Interface (CPRI), Open Base Station Architecture Initiative (OBSAI) link, Serial RapidIO, and Society of Motion Picture and Television Engineers (SMPTE).

10. The integrated circuit device of claim 5, wherein the integrated circuit device is part of a selected one of: a datacenter, a computer networking system, a data networking system, a digital signal processing system, a graphics processing system, a video processing system, a computer vision processing system, a cellular base station, a virtual reality system, an augmented reality system, a network functions virtualization platform, an artificial neural network, and an autonomous driving system.

11. The integrated circuit device of claim 5, wherein the integrated circuit device is a programmable integrated circuit device.

12. The integrated circuit device of claim 5, wherein the plurality of link bring-up modes comprise an initialization mode.

13. The integrated circuit device of claim 5, wherein the plurality of link bring-up modes comprise a data transmission mode during which data is exchanged between the integrated circuit device and the remote device.

14. The integrated circuit device of claim 5, wherein the plurality of link bring-up modes comprise an auto negotiation mode during which the integrated circuit device and the remote device exchange and choose common device capabilities, and wherein the common device capabilities comprise data rate and forward error correction ability.

15. The integrated circuit device of claim 14, wherein the common device capabilities comprise pause ability that indicates if a device is capable of sending placeholder data to help maintain a link during idle periods.

16. The integrated circuit device of claim 5, wherein the plurality of link bring-up modes comprise a link training mode during which the integrated circuit device and the remote device adjust signal transmission strength, and wherein the communications protocol block acquires frame lock in the link training mode.

17. The integrated circuit device of claim 5, wherein the plurality of link bring-up modes comprise a link training mode during which the integrated circuit device and the remote device adjust signal transmission strength, and wherein the communications protocol block sends commands directing the remote device to increase signal strength and adjusts receiver equalization settings to optimize signal quality in the link training mode.

18. The integrated circuit device of claim 17, wherein the communications protocol block asserts a local receive ready signal in the link training mode.

* * * * *